(12) United States Patent
Kosugi et al.

(10) Patent No.: US 10,719,919 B1
(45) Date of Patent: Jul. 21, 2020

(54) INFORMATION PROCESSING APPARATUS, AND CONTROL METHOD

(71) Applicant: LENOVO (SINGAPORE) PTE. LTD., Singapore (SG)

(72) Inventors: Kazuhiro Kosugi, Yokohama (JP); Masashi Nishio, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/506,355

(22) Filed: Jul. 9, 2019

(30) Foreign Application Priority Data

Feb. 28, 2019 (JP) .................................. 2019-035274

(51) Int. Cl.
| | |
|---|---|
| *H04N 5/232* | (2006.01) |
| *G06T 5/00* | (2006.01) |
| *G06T 7/194* | (2017.01) |
| *G06K 9/00* | (2006.01) |
| *G06T 7/521* | (2017.01) |
| *G06F 21/60* | (2013.01) |
| *G06F 21/32* | (2013.01) |

(52) U.S. Cl.
CPC .............. *G06T 5/002* (2013.01); *G06F 21/32* (2013.01); *G06F 21/604* (2013.01); *G06K 9/00288* (2013.01); *G06T 7/194* (2017.01); *G06T 7/521* (2017.01); *H04N 5/23216* (2013.01); *G06T 2207/10024* (2013.01); *G06T 2207/10028* (2013.01); *G06T 2207/10048* (2013.01); *G06T 2207/20092* (2013.01); *G06T 2207/30201* (2013.01)

(58) Field of Classification Search
CPC .. H04N 5/23219; H04N 5/2226; G06F 21/31; G06F 21/32
USPC .......................................... 348/14.01, 207.99
See application file for complete search history.

(56) References Cited

U.S. PATENT DOCUMENTS

| | | | |
|---|---|---|---|
| 2011/0181683 A1* | 7/2011 | Nam ................... | H04N 5/44513 348/14.07 |
| 2014/0362163 A1* | 12/2014 | Winterstein ............ | G06T 5/002 348/14.07 |
| 2015/0138302 A1* | 5/2015 | Sethi ....................... | H04N 7/15 348/14.07 |

(Continued)

FOREIGN PATENT DOCUMENTS

JP      2003067339 A     3/2003

*Primary Examiner* — Anthony J Daniels
(74) *Attorney, Agent, or Firm* — Shimokaji IP

(57) ABSTRACT

An information processing apparatus includes: an imaging unit configured to acquire an RGB image of an imaging target, and to output either a captured image in which a background area determined to be the background in the RGB image is subjected to blur processing based on the depth information, or a captured image in which the blur processing is not performed on the RGB image; an authentication processing section configured to execute authentication processing based on the captured image output from the imaging unit; a login processing section configured to execute login processing to log in based on the authentication result by the authentication processing section; and a blur processing control section configured to instruct the imaging unit not to perform the blur processing at least during a period in which the authentication processing section executes the authentication processing.

8 Claims, 8 Drawing Sheets

(56) References Cited

U.S. PATENT DOCUMENTS

2018/0108101 A1* 4/2018 Rodriguez ........... G06K 9/4628
2020/0026831 A1* 1/2020 Alameh .................... G06T 7/50

* cited by examiner

INFORMATION PROCESSING APPARATUS, AND CONTROL METHOD

FIELD OF THE INVENTION

The present invention relates to an information processing apparatus, and a control method.

BACKGROUND OF THE INVENTION

There is a technique to perform face authentication using an image obtained by shooting a user upon system login (for example, Japanese Patent Application Laid-Open No. 2003-67339). This technique may be used as login authentication of a personal computer for personal use.

SUMMARY OF THE INVENTION

The way of working outside of the office such as at home has been increasing, and the opportunity to conduct a video conference using video and voice outside of the office through a personal computer has also been increasing. Video has also been privately delivered from home. In such a situation, there is a desire to blur the background of video from the viewpoint of privacy protection.

However, processing for blurring the background in real time is high in processing load, and it is difficult to conduct a video conference or deliver video on an application side. Therefore, a method of performing blur processing on a camera side is considered, but if the blur processing is performed on the camera side, face authentication may not be able to be performed correctly at the time of login authentication.

The present invention has been made in view of the above circumstances, and it is an object thereof to provide an information processing apparatus, a control method, and a program, which appropriately control blur processing on a camera side.

The present invention has been made to solve the above problem, and an information processing apparatus according to the first aspect of the present invention includes: an imaging unit configured to acquire an RGB image of an imaging target and depth information generated as a result of detecting a distance to the imaging target using infrared light, and to output either a captured image in which a background area determined to be the background in the RGB image is subjected to blur processing based on the depth information, or a captured image in which the blur processing is not performed on the RGB image; an authentication processing section configured to execute authentication processing based on the captured image output from the imaging unit; a login processing section configured to execute login processing to log in based on the authentication result by the authentication processing section; and a blur processing control section configured to instruct the imaging unit not to perform the blur processing at least during a period in which the authentication processing section executes the authentication processing.

The above-described information processing apparatus may further include a logoff processing section configured to execute logoff processing to log off from the login state, wherein the blur processing control section instructs the imaging unit not to perform the blur processing according to the timing when the logoff processing section executes the logoff processing.

The above-described information processing apparatus may also be such that the blur processing control section instructs the imaging unit to perform the blur processing in response to login by the login processing section.

The above-described information processing apparatus may further include: an input unit configured to accept user's operations; and a setting section configured to set whether to perform the blur processing in the login state based on a user's operation accepted by the input unit.

The above-described information processing apparatus may further be such that, when it is set to perform the blur processing by the setting section in response to the login by the login processing section, the blur processing control section instructs the imaging unit to perform the blur processing, while when it is set not to perform the blur processing by the setting section, the blur processing control section instructs the imaging unit not to perform the blur processing.

An information processing apparatus according to the second aspect of the present invention includes: an authentication processing section configured to execute authentication processing based on a captured image output from an imaging unit which outputs either a captured image, obtained by capturing an image of an imaging target, extracting a background area from the captured image, and performing blur processing on the extracted background area, or a captured image without being subjected to the blur processing; a login processing section configured to execute login processing to log in based on the authentication result by the authentication processing section; a logoff processing section configured to execute logoff processing to log off from the login state; and a blur processing control section configured to instruct the imaging unit not to perform the blur processing in the logoff state.

A control method for an information processing apparatus according to the third aspect of the present invention includes: an imaging step of causing an imaging unit to acquire an RGB image of an imaging target and depth information generated as a result of detecting a distance to the imaging target using infrared light, and to output either a captured image in which a background area determined to be the background in the RGB image is subjected to blur processing based on the depth information, or a captured image in which the blur processing is not performed on the RGB image; an authentication processing step of causing an authentication processing section to execute authentication processing based on the captured image output from the imaging unit; a login processing step of causing a login processing section to execute login processing to log in based on the authentication result by the authentication processing section; and a blur processing control step of causing a blur processing control section to instruct the imaging unit not to perform the blur processing at least during a period in which the authentication processing section executes the authentication processing.

A control method for an information processing apparatus according to the fourth aspect of the present invention includes: an acquisition step of causing an acquisition unit to acquire a captured image output from an imaging unit which outputs either a captured image, obtained by capturing an image of an imaging target, extracting a background area from the captured image, and performing blur processing on the extracted background area, or a captured image without being subjected to the blur processing; an authentication processing step of causing an authentication processing section to execute authentication processing based on the captured image acquired by the acquisition unit; a login processing step of causing a login processing section to execute login processing to log in based on the authentication result by the authentication processing section; a logoff processing step of causing a logoff processing section to execute logoff processing to log off from the login state; and a blur processing control step of causing a blur processing control section to instruct the imaging unit not to perform the blur processing in the logoff state.

The above-described aspects of the present invention can control blur processing on a camera side appropriately.

DETAILED DESCRIPTION OF THE INVENTION

First Embodiment

An outline of an information processing apparatus 1 according to a first embodiment of the present invention will first be described. The information processing apparatus 1 according to the embodiment is, for example, a laptop PC (Personal Computer). The information processing apparatus 1 includes an imaging unit (camera). This imaging unit is used not only in authentication processing upon login (login authentication processing), but only in an application executed on the information processing apparatus 1. Upon login, the information processing apparatus 1 performs face authentication based on an image of a user captured by the imaging unit to execute authentication processing as to whether the user is a preregistered, authorized user or not. Further, after the login, the information processing apparatus 1 uses the imaging unit in an application or the like to shoot a video in order to conduct a video conference or deliver the video.

Here, when such an application or the like as to conduct a video conference or deliver a video is used, there is a desire to blur the background of the video from the viewpoint of privacy protection. Therefore, the information processing apparatus 1 is equipped with a function to perform blur processing on the background of an image captured by the imaging unit.

Figure 1:
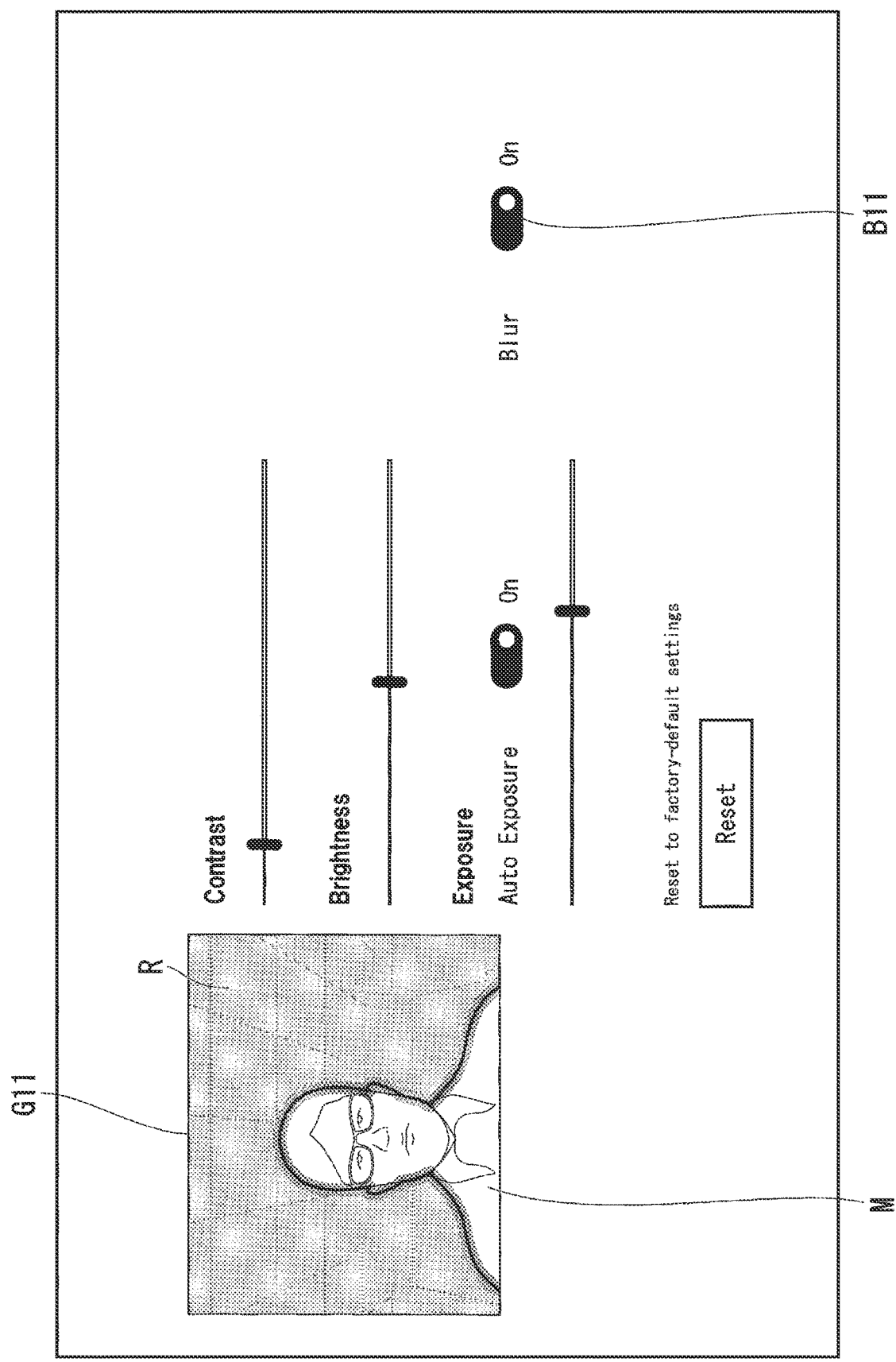
FIG. 1 is a diagram illustrating an example of a settings screen of an imaging unit (camera) according to a first embodiment.

FIG. 1 is a diagram illustrating an example of an imaging unit (camera) settings screen according to the embodiment. The illustrated settings screen is a settings screen of an application for setting up processing on the camera side, different from the application to conduct a video conference or deliver a video. On the illustrated settings screen, operating elements (sliders or buttons) for setting the contrast, brightness, exposure, and the like of an image to be captured are displayed, and an operation button B11 for setting on/off of blur processing (Blur) for blurring the background is displayed. A preview video of a captured image with various settings reflected therein is displayed on a preview screen G11. Since the blur processing is processing on the camera side, rather than processing on the side of the application to conduct a video conference or deliver a video, the settings are not different from application to application, i.e., the settings are identical as the settings on the camera side when any application uses the camera.

Here, when background blurring processing is performed, the imaging unit extracts, from a captured image, a background area R other than a main subject M (e.g., a person) to perform blur processing on the extracted background area R. However, there may be a case where boundaries such as the outline of the person (face or the like) as the main subject M (for example, the boundary between the face area and the background area) are also blurred. If the boundaries such as the outline of the person (face or the like) are blurred, face authentication cannot be performed correctly. Therefore, the information processing apparatus 1 according to the embodiment cancels the blur processing not to perform the blur processing at least during authentication processing. Thus, privacy protection at a video conference or for video delivery can be balanced with the authentication processing upon login.

The information processing apparatus 1 according to the embodiment will be described in detail below. Note that the information processing apparatus 1 is described by taking a laptop PC as a typical example, but the information processing apparatus 1 may be a desktop PC. Further, a tablet PC, a smartphone, or the like should not be excluded as the information processing apparatus 1.

The information processing apparatus 1 can make a transition at least between a normal operating state (power-on state) and a standby state as system operating states. The normal operating state is an operating state capable of executing processing without being particularly limited, which corresponds, for example, to S0 state defined in the ACPI (Advanced Configuration and Power Interface) specification. The standby state is a state in which at least part of system processing is limited. For example, the standby state is a state in which at least the display of the display unit appears to be off (screen OFF), which is an operating state lower in power consumption than the normal operating state. The standby state may be the standby state or a sleep state, or a state corresponding to modern standby in Windows (registered trademark) or S3 state (sleep state) defined in the ACPI specification. Further, a hibernation state, a power-off state, or the like may be included in the standby state. The hibernation state corresponds, for example, to S4 state defined in the ACPI specification. The power-off state corresponds, for example, to S5 state (shutdown state) defined in the ACPI specification.

In the following, a transition of the system operating state from the standby state to the normal operating state may also be called a "boot/start." In the standby state, since the activation level is generally lower than the normal operating state, the start of the system processing of the information processing apparatus 1 leads to the activation of the operation of the system processing on the information processing apparatus 1.

Figure 2A:
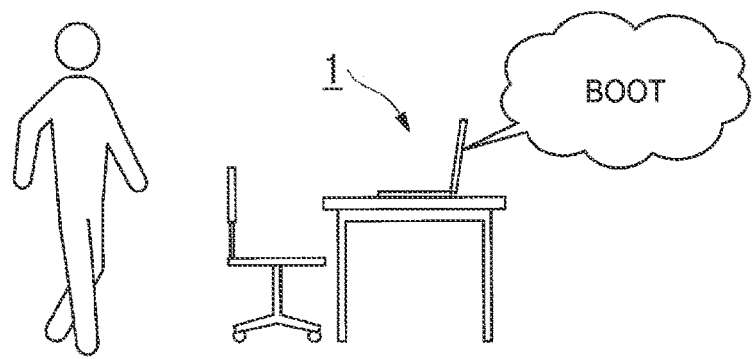
FIGS. 2A-C are diagrams for describing an outline of HPD processing of an information processing apparatus according to the first embodiment.
Figure 2B:
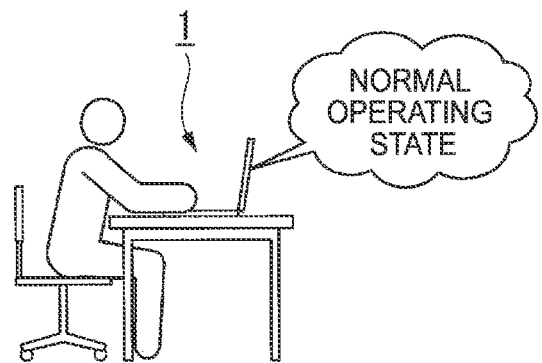
Figure 2C:
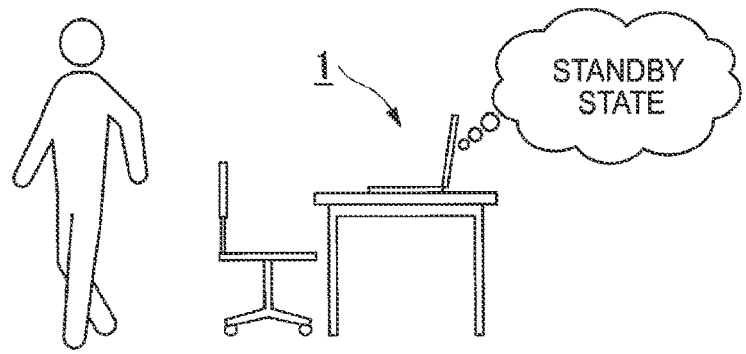

The information processing apparatus 1 includes a proximity sensor to be described later to detect a person present in the neighborhood of the information processing apparatus 1. This processing for detecting the presence of a person may also be called HPD (Human Presence Detection) processing. The information processing apparatus 1 detects a person present in the neighborhood of the information processing apparatus 1 to control the operation of the system processing based on the detection result. FIG. 2 is a diagram for describing an outline of the HPD processing of the information processing apparatus 1 according to the embodiment. As illustrated in FIG. 2A, when detecting that a person approaches the information processing apparatus 1, the information processing apparatus 1 automatically starts the system processing. Further, as illustrated in FIG. 2B, in a state where the person is present in front of the information processing apparatus 1 (Presence), the information processing apparatus 1 limits the system processing not to make a transition to the standby state, and continues the normal operating state. Then, as illustrated in FIG. 2C, when detecting that the person leaves the information processing apparatus 1, the information processing apparatus 1 makes a transition of the system processing to the standby state.

(External Structure of Information Processing Apparatus)

Figure 3:
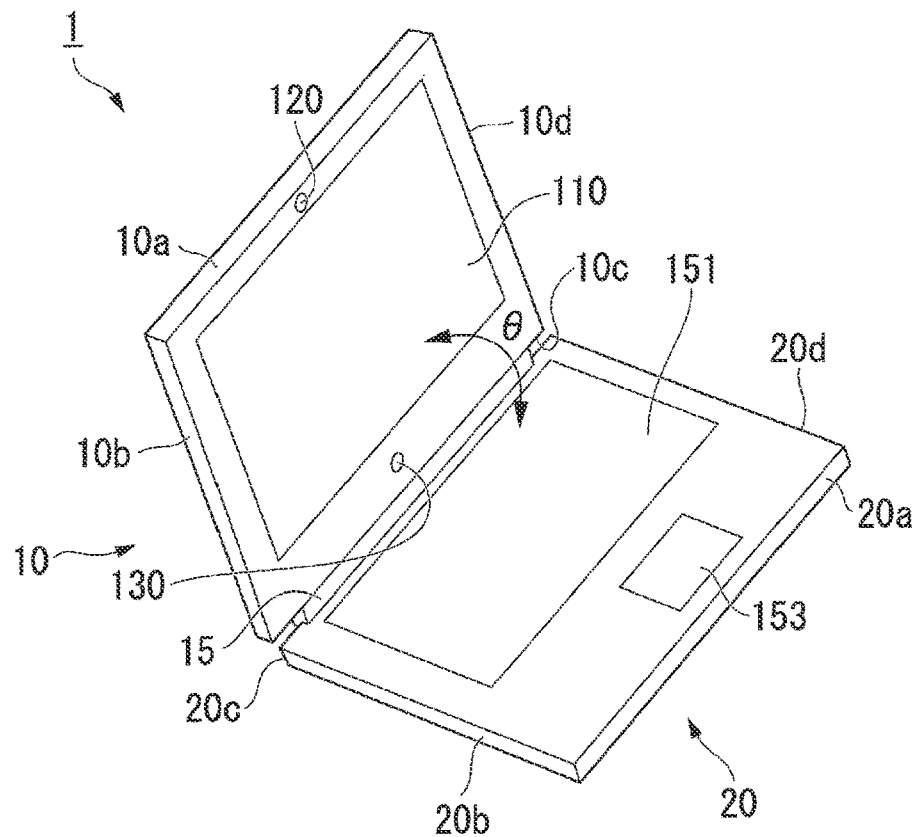
FIG. 3 is a perspective view illustrating an external structure example of the information processing apparatus according to the first embodiment.

FIG. 3 is a perspective view illustrating an external structure example of the information processing apparatus 1 according to the embodiment.

The information processing apparatus 1 includes a first chassis 10, a second chassis 20, and a hinge mechanism 15. The first chassis 10 and the second chassis 20 are coupled by using the hinge mechanism 15. The first chassis 10 is rotatable around an axis of rotation formed by the hinge mechanism 15 relative to the second chassis 20. The direction of the axis of rotation is parallel to side faces 10c and 20c on which the hinge mechanism 15 is placed.

The first chassis 10 is also called A cover or a display chassis. The second chassis 20 is also called C cover or a system chassis. In the following description, side faces on which the hinge mechanism 15 is provided among side faces of the first chassis 10 and the second chassis 20 are referred to as the side faces 10c and 20c, respectively. Among the side faces of the first chassis 10 and the second chassis 20, faces opposite to the side faces 10c and 20c are referred to as side faces 10a and 20a, respectively. In the figure, the direction from the side face 20a to the side face 20c is referred to as "back," and the direction from the side face 20c to the side face 20a is referred to as "front." The right hand and left hand in the backward direction are referred to as "right" and "left," respectively. The left side faces of the first chassis 10 and the second chassis 20 are referred to as side faces 10b and 20b, respectively, and right side faces are referred to as side faces 10d and 20d, respectively. Further, a state where the first chassis 10 and the second chassis 20 overlap each other and are completely closed (a state of open angle θ=0°) is referred to as a "closed state." The faces of the first chassis 10 and the second chassis 20 on the face-to-face sides in the closed state are referred to as respective "inner faces," and the faces opposite to the inner faces are referred to as "outer faces." Further, a state opposite to the closed state, where the first chassis 10 and the second chassis 20 are open is referred to as an "open state."

The external appearance of the information processing apparatus 1 in FIG. 3 illustrates an example of the open state. The open state is a state where the side face 10a of the first chassis 10 and the side face 20a of the second chassis 20 are separated. In the open state, the inner faces of the first chassis 10 and the second chassis 20 appear so that the information processing apparatus 1 will be expected to be able to carry out normal operation. The open state is a state where the open angle θ between the inner face of the first chassis 10 and the inner face of the second chassis 20 is equal to or more than a predetermined angle, typically about 100 to 130°. The range of open angles θ to be open state can be set arbitrarily according to the range of angles rotatable by the hinge mechanism 15, or the like.

A display unit 110 is provided on the inner face of the first chassis 10. The display unit 110 is configured to include a liquid crystal display (LCD) or an organic EL (Electro Luminescence) display, and the like. Further, an imaging unit 120 and a proximity sensor 130 are provided in a peripheral area of the display unit 110 on the inner face of the first chassis 10. The imaging unit 120 is arranged on the side of the side face 20a in the peripheral area of the display unit 110. The proximity sensor 130 is arranged on the side of the side face 20c in the peripheral area of the display unit 110.

In the open state, the imaging unit 120 captures an image of an object within a predetermined angle of view in a direction (front) to face the inner face of the first chassis 10. The predetermined angle of view is an imaging angle of view defined by an imaging device included in the imaging unit 120 and an optical lens provided in front of an imaging surface of the imaging device. Here, the imaging unit 120 may be, for example, a hybrid camera having a function as an RGB camera which captures RGB images and a function as an IR camera which acquires depth information generated as a result of detecting a distance to an imaging target using IR (infrared light). The details will be described later with reference to FIG. 5.

The proximity sensor 130 detects an object (for example, a person) present in the neighborhood of the information processing apparatus 1. For example, the proximity sensor 130 is an infrared distance sensor configured to include a light-emitting part for emitting infrared light and a light-receiving part for receiving reflected light which is the infrared light returned after being emitted and reflected on the surface of the object. The proximity sensor 130 detects, with a predetermined sampling frequency (for example, 1 Hz), light received by the light-receiving part, and outputs a detection signal according to the distance to the object (for example, the person) by using a triangulation method for calculating the distance based on the imaging position of the received light or a ToF (Time of Flight) method for converting, to a distance, a time difference from light-emitting to light-receiving, or the like.

Figure 4:
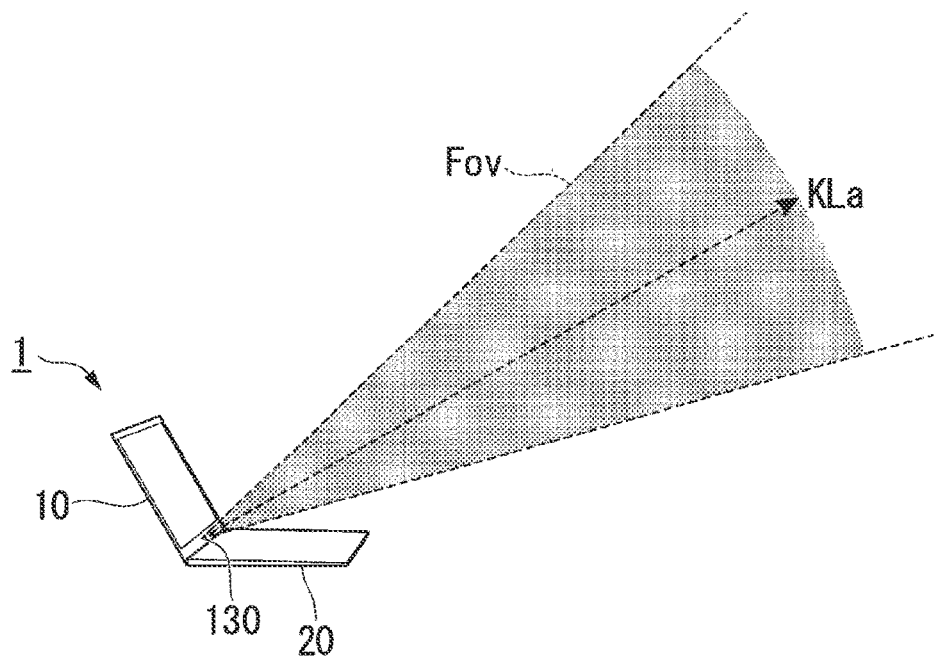
FIG. 4 is a schematic diagram illustrating a sensor detection range of a proximity sensor.

FIG. 4 is a schematic diagram illustrating a sensor detection range of the proximity sensor 130. In the open state, the proximity sensor 130 arranged on the inner face of the first chassis 10 detects an object (for example, a person) in a direction (front) to face the inner face of the first chassis 10. A detection field of view FoV indicates an angle detectable by the proximity sensor 130. A detection limit distance KLa indicates a limit distance detectable by the proximity sensor 130. A range defined by the detection field of view FoV (for example, 25° to 30°) and the detection limit distance KLa (for example, 120 cm) is the sensor detection range detectable by the proximity sensor 130.

Note that the proximity sensor 130 may be a sensor using infrared light emitted by a light-emitting diode, or a sensor using infrared laser emitting a light beam narrower in wavelength band than the infrared light emitted by the light-emitting diode. Further, the proximity sensor 130 is not limited to the infrared distance sensor, and it may be a sensor using any other method, such as an ultrasonic sensor or a sensor using an UWB (Ultra Wide Band) radar, as long as the sensor detects a distance to the object.

Note that, when the imaging unit 120 is the hybrid camera described above, an object (for example, a person) present in the neighborhood of the information processing apparatus 1 may be detected based on the depth information acquired by the imaging unit 120 without including the proximity sensor 130, or the proximity sensor 130 and the imaging unit 120 may be used in combination.

Returning to FIG. 3, a keyboard 151 and a touch pad 153 are provided as an input device on the inner face of the second chassis 20. Note that a touch sensor may be included as the input device instead of or in addition to the keyboard 151 and the touch pad 153, and a mouse and an external keyboard may also be connected. When the touch sensor is provided, an area corresponding to the display surface of the display unit 110 may be configured as a touch panel for accepting operations. Further, a microphone used to input voice may be included in the input device.

In the closed state where the first chassis 10 and the second chassis 20 are closed, the display unit 110, the imaging unit 120, and the proximity sensor 130 provided on the inner face of the first chassis 10 are covered with the inner face of the second chassis 20, and put in a state of being disabled from fulfilling their functions. In the state where the first chassis 10 and the second chassis 20 are completely closed, the open angle θ is 0'.

(Configuration of Information Processing Apparatus)

Figure 5:
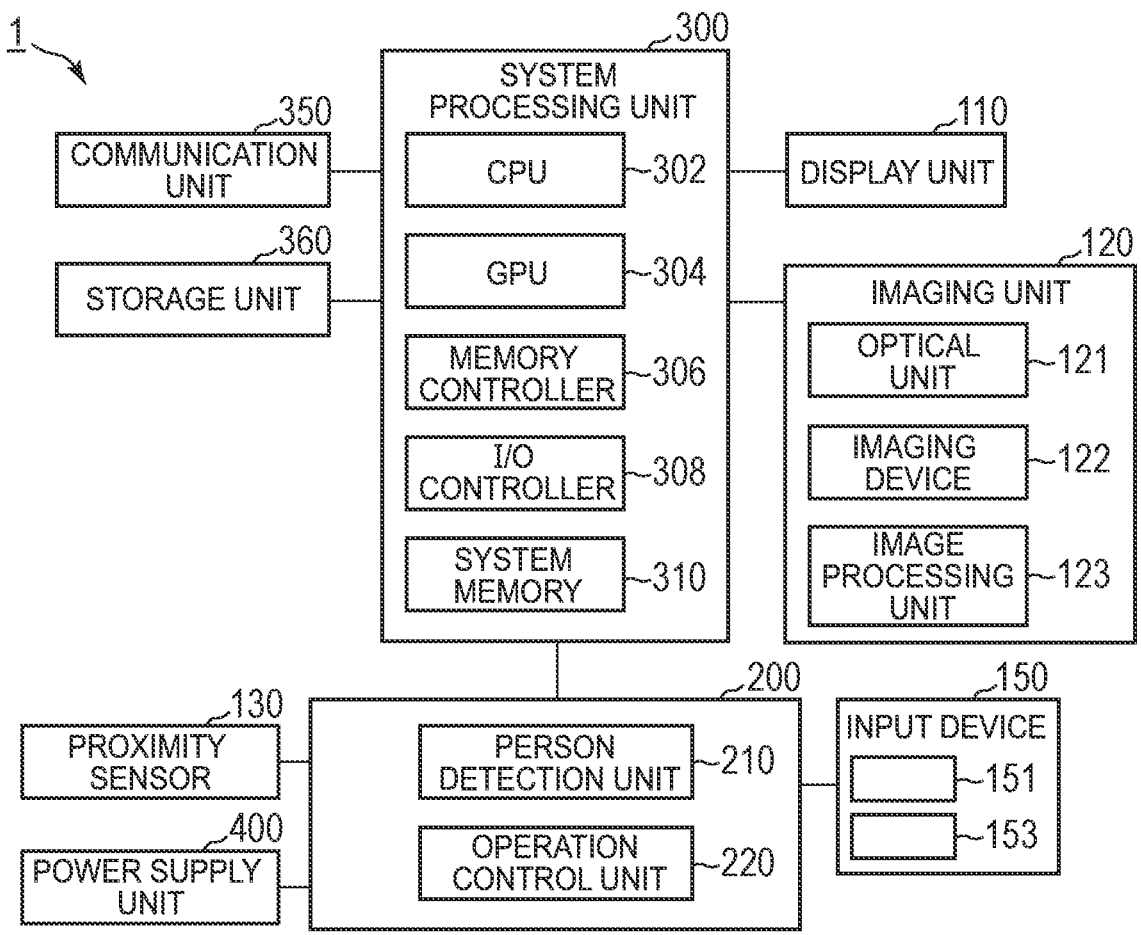
FIG. 5 is a schematic block diagram illustrating a configuration example of the information processing apparatus according to the first embodiment.

FIG. 5 is a schematic block diagram illustrating a configuration example of the information processing apparatus 1 according to the embodiment. The information processing apparatus 1 is configured to include the display unit 110, the imaging unit 120, the proximity sensor 130, a motion sensor 140, an input device 150, an EC (Embedded Controller) 200, a system processing unit 300, a communication unit 350, a storage unit 360, and a power supply unit 400. The information processing apparatus 1 further includes an input/output terminal. The display unit 110 displays display data generated in system processing executed by the system processing unit 300.

The imaging unit 120 captures an image of an object within a predetermined angle of view in a direction (front) to face the inner face of the first chassis 10, and outputs the captured image to the system processing unit 300. For example, when the face of a person approaching the information processing apparatus 1 is contained within the angle of view of the imaging unit 120, the imaging unit 120 captures a face image of the person, and outputs the captured face image to the system processing unit 300. For example, the imaging unit 120 is a hybrid camera having a function as an RGB camera to capture RGB images and a function as an IR camera to acquire depth information generated as a result of detecting a distance to an imaging target using IR (infrared light). Note that the imaging unit 120 is connected to the system processing unit 300 through a USB (Universal Serial Bus) interface, a MIPI (Mobile Industry Processor Interface) (registered trademark), or the like. The system processing unit 300 acquires the image captured by the imaging unit 120.

The imaging unit 120 is configured to include an optical unit 121, an imaging device 122, and an image processing unit 123. The optical unit 121 is configured to include an optical lens for guiding an image of an object within the angle of view to the imaging device 122, an infrared laser, an IR cut filter, and the like. The IR cut filter is a filter for cutting infrared wavelengths from light to be received by the imaging device 122. The IR cut filter is adapted such that the position thereof is movable by an unillustrated driving unit to be driven to a position on an optical axis of the optical lens when the imaging unit 120 functions as the RGB camera, or to be driven to a position off the optical lens when the imaging unit 120 functions as the IR camera. When the imaging unit 120 functions as the RGB camera, the imaging device 122 receives visible light through the optical lens and the IR cut filter, and outputs, to the image processing unit 123, an RGB image signal after being subjected to photoelectric conversion. On the other hand, when the imaging unit 120 functions as the IR camera, the imaging device 122 receives, through the optical lens, reflected light which is infrared light returned after being output from the infrared laser and reflected on an object (imaging target), and outputs, to the image processing unit 123, an IR image signal after being subjected to photoelectric conversion. The image processing unit 123 generates image data of an RGB image from the acquired RGB image signal. Further, the image processing unit 123 generates depth information indicating the distance to the imaging target based on the acquired IR image signal. A triangulation method, a ToF method, or the like may be used to generate the depth information.

Further, based on the image data of the RGB image and the depth information, the image processing unit 123 determines a background area of the RGB image. For example, the image processing unit 123 determines a relatively close-range subject to be a main subject such as a person (for example, the main subject M in FIG. 1), and determines an area other than the area of the close-range subject to be a background area (for example, the background area R in FIG. 1). Further, the image processing unit 123 performs blur processing on image data of the area determined to be the background area of the RGB image. As the blur processing, any blur processing such as Gaussian blur processing or pixelization processing may be applied. The image processing unit 123 switches between whether or not to perform blur processing on the background area of the RGB image according to an instruction from the system processing unit 300.

Thus, the imaging unit 120 acquires the RGB image of the imaging target and the depth information generated as a result of detecting the distance to the imaging target using IR. Further, according to an instruction from the system processing unit 300, the imaging unit 120 outputs either a captured image, obtained by performing blur processing on the background area of the RGB image, or a captured image without performing the blur processing on the RGB image.

The proximity sensor 130 detects an object (for example, a person) present in a direction (front) to face the inner face of the first chassis 10, and outputs, to the EC 200, a detection signal indicative of the detection result.

The input device 150 is an input unit for accepting user's input, which is configured to include, for example, the keyboard 151 and the touch pad 153. In response to accepting operations on the keyboard 151 and the touch pad 153, the input device 150 outputs, to the EC 200, operation signals indicative of the content of the operations.

The power supply unit 400 supplies power through a power system for supplying power to each unit of the information processing apparatus 1 according to the operating state of each unit. The power supply unit 400 includes a DC (Direct Current)/DC converter. The DC/DC converter converts, the voltage of DC power, supplied from an AC (Alternate Current)/DC adapter or a battery pack, to voltage requested for each unit. The power with the voltage converted by the DC/DC converter is supplied to each unit through each power system. For example, the power supply unit 400 supplies power to each unit through each power system based on a control signal according to the operating state of each unit input from the EC 200.

The EC 200 is a microcomputer configured to include a CPU, a RAM (Random Access Memory), a ROM (Read Only Memory), an I/O (Input/Output) logic circuit, and the like. The CPU of the EC 200 reads a control program prestored in the ROM thereof and executes the read control program to fulfill the function. The EC 200 operates independently of the system processing unit 300 to control the operation of the system processing unit 300 and manage the operating state. The EC 200 is connected to the proximity sensor 130, the input device 150, and the power supply unit 400.

For example, the EC 200 acquires a detection signal indicative of the detection result from the proximity sensor 130 to control the operating state of the system processing unit 300 based on the detection result. Further, the EC 200 communicates with the power supply unit 400 to acquire information on a battery state (remaining battery capacity, or the like) from the power supply unit 400 and to output, to the power supply unit 400, a control signal or the like in order to control the supply of power according to the operating state of each unit of the information processing apparatus 1. Further, the EC 200 acquires operation signals from the input device 150, and outputs, to the system processing unit 300, an operation signal related to processing of the system processing unit 300 among the acquired operation signals. For example, the EC 200 includes a person detection unit 210 and an operation control unit 220 as a functional configuration related to HPD processing.

Based on the result of detection made by the proximity sensor 130 with a predetermined sampling frequency (for example, 1 Hz), the person detection unit 210 detects a person present in front of the information processing apparatus 1. For example, based on the detection signal acquired from the proximity sensor 130, the person detection unit 210 detects a distance to the person present within a predetermined range in front of the information processing apparatus 1. The predetermined range means a person detection range set by the person detection unit 210 as a range of detecting the person. The person detection range is a range defined by a detection field of view indicative of a field of view as a detection target and the maximum detection distance indicative of a distance as a detection target.

For example, the person detection range corresponds to the sensor detection range of the proximity sensor 130. Specifically, the detection field of view in the person detection range corresponds, for example, to the detection field of view FoV of the proximity sensor 130 (see FIG. 4). Further, the maximum detection distance in the person detection range corresponds, for example, to the detection limit distance KLa of the proximity sensor 130 (see FIG. 4). Note that the person detection range may be such that a limitation on the maximum detection distance or the minimum detection distance is set as part of the sensor detection range of the proximity sensor 130. In other words, the person detection unit 210 may also detect the person by setting, as the person detection range, a preset range in the sensor detection range of the proximity sensor 130.

For example, based on the detection signal acquired from the proximity sensor 130, the person detection unit 210 detects whether an object (for example, a person) is present in the person detection range. When an object (for example, a person) is present, the person detection unit 210 detects a distance to the object (for example, the person) from the proximity sensor 130. In the following, the description that the person detection unit 210 detects an object (for example, a person) may also be simply such that the person is detected. In other words, the description that the person detection unit 210 detects a person includes both that the person detection unit 210 detects a person and that the person detection unit 210 detects an object other than a person. Specifically, when acquiring a detection signal according to the distance to the person acquired from the proximity sensor 130, the person detection unit 210 detects that the person is present within the person detection range, and detects the distance to the person. On the other hand, when acquiring no detection signal according to the distance to a person from the proximity sensor 130, the person detection unit 210 detects that no person is present within the person detection range.

Further, when detecting a person after no person is detected within the person detection range, the person detection unit 210 determines that the person approaches the front of the information processing apparatus 1, and detects the approach of the person to the information processing apparatus 1. Further, when continuing to detect a person after detecting the person within the person detection range, the person detection unit 210 determines that the person is present in front of the information processing apparatus 1. Further, when no longer detecting the person after the person is detected within the person detection range, the person detection unit 210 determines that the person present in front of the information processing apparatus 1 has left, and detects leaving of the person from the information processing apparatus 1.

When the person is detected within the person detection range by the person detection unit 210, the operation control unit 220 starts system processing by the system processing unit 300. Specifically, when the person detection unit 210 detects a person after no person is detected within the person detection range (that is, when the approach of a person to the information processing apparatus 1 is detected), the operation control unit 220 starts the system processing. More specifically, when starting the system processing by the system processing unit 300, the operation control unit 220 outputs, to the power supply unit 400, a control signal to supply power necessary for the operation of each unit of the information processing apparatus 1. After that, the operation control unit 220 outputs a start signal to instruct the system processing unit 300 to start the system processing. When acquiring the start signal, the system processing unit 300 starts the system processing to make a transition to the normal operating state.

Further, when the person detection unit 210 continues to detect a person within the person detection range, the operation control unit 220 restricts the system processing by the system processing unit 300 not to make a transition to the standby state so as to continue the normal operating state. However, even when the person detection unit 210 continues to detect a person within the person detection range, the operation control unit 220 may make a transition from the normal operating state to the standby state depending on a predetermined condition (for example, when the duration of non-operation lasts for a preset period of time).

Further, when the person detection unit 210 no longer detects the person within the person detection range after the person is detected (that is, when the person detection unit 210 detects leaving of the person from the information processing apparatus 1), the operation control unit 220 makes a transition of the system processing by the system processing unit 300 from the normal operating state to the standby state. More specifically, the operation control unit 220 outputs a standby signal to instruct the system processing unit 300 to make a transition of the system processing from the normal operating state to the standby state. When acquiring the standby signal, the system processing unit 300 makes the transition of the system processing from the normal operating state to the standby state. After that, the operation control unit 220 outputs, to the power supply unit 400, a control signal to stop the supply of power unnecessary in the standby state.

The system processing unit 300 is configured to include a CPU 302, a GPU (Graphic Processing Unit) 304, a memory controller 306, an I/O (Input-Output) controller 308, a system memory 310, and an authentication processing unit 321, where various processes of application software are executable on an operating system (OS) in the system processing by the OS. Note that the CPU 302 and the GPU 304 may be collectively called a processor.

The CPU 302 executes processes by the OS and processes by an application(s) running on the OS. Further, the CPU 302 makes a transition of the operating state of the system by the HPD processing performed by the EC 200 based on the detection result of the proximity sensor 130. For example, when the operating state is the standby state and the start signal is input from the EC 200, the CPU 302 makes a transition of the operating state from the standby state to the normal operating state. For example, in the case where the operating state is the sleep state, the hibernation state, or the power-off state, when power is supplied from the power supply unit 400 and the start signal is input from the EC 200, the CPU 302 starts boot processing. In the boot processing, the CPU 302 detects and initializes the minimum devices such as the system memory 310 and the storage unit 360 (pre-boot). The CPU 302 loads system firmware from the storage unit 360 into the system memory 310 to detect and initialize the other devices such as the communication unit 350 and the display unit 110 (post-processing).

Initialization includes processing such as initial parameter settings. In a transition (resume) from the sleep state to the normal operating state, part of the post-processing may be omitted. After completion of the boot processing, the CPU 302 starts execution of the system processing by the OS (boot). For example, when the operating state is the standby state and the start signal is input from the EC 200, the CPU 302 resumes execution of software whose execution has been stopped.

In the boot processing, the CPU 302 executes login authentication processing to determine whether to allow access to the OS. When the boot processing by the OS is started, the CPU 302 executes the login authentication processing before allowing access to the OS, and the subsequent boot processing is paused until login is allowed in the login authentication processing. The login authentication processing is user authentication processing to determine whether the person using the information processing apparatus 1 is a preregistered, authorized user or not. As the login authentication, there are password authentication, face authentication, fingerprint authentication, and the like. In the embodiment, an example of using face authentication processing will be described. Specifically, the description will be made later with reference to FIG. 6.

In addition to making a transition of the operating state by the HPD processing described above, the CPU 302 also makes a transition of the operating state as OS processing. For example, when the duration of non-operation lasts for a preset period of time in the normal operating state, the CPU 302 makes a transition from the normal operating state to the standby state by the OS processing. The preset period of time is a threshold value for determining the transition to the standby state when the duration of non-operation has lasted, which is settable in the OS system settings. For example, when the duration of non-operation has lasted, there are options such as "screen OFF time" to determine a transition to a state where the display of the display unit 110 is turned OFF (screen OFF), "sleep time" to determine a transition to the sleep state, and the like, and the user can select and set an option arbitrarily from among these options. In addition to time options (for example, "one minute," "two minutes," "four minutes," "ten minutes," "half-hour," "one hour," . . . ), a setting of prohibiting the transition to screen OFF or a setting of prohibiting the transition to the sleep state (for example, "none"), and the like are included.

The GPU 304 is connected to the display unit 110. The GPU 304 executes image processing under the control of the CPU 302 to generate display data. The GPU 304 outputs the generated display data to the display unit 110. Note that the CPU 302 and the GPU 304 may be integrally formed as one core, or the load may be allocated between the CPU 302 and the GPU 304 formed as individual cores, respectively. The number of processors is not limited to one, and it may be plural.

The memory controller 306 controls reading data from and writing data to the system memory 310, the storage unit 360, and the like, by the CPU 302 and the GPU 304.

The I/O controller 308 controls input/output of data from the communication unit 350, the display unit 110, and the EC 200.

The system memory 310 is used as a reading area of an execution program of the processor and a working area to write processed data.

The communication unit 350 is connected to other devices communicably through a wireless or wired communication network to send and receive various data. For example, the communication unit 350 is configured to include a wired LAN interface such as the Ethernet (registered trademark), a wireless LAN interface such as Wi-Fi (registered trademark), and the like.

The storage unit 360 is configured to include storage media, such as an HDD (Hard Disk Drive), a secure NVRAM (Non-Volatile RAM), a ROM (Read Only Memory), and the like. The HDD stores the OS, device drivers, various programs such as applications, and various data acquired by the operation of the programs. In the secure NVRAM, authentication data used to authenticate each user are stored. Stored in the authentication data are identification information of each user and authentication information in association with each other. The secure NVRAM is protected (locked) not to be able to be accessed from an OS operating environment via the I/O controller 308. Note, however, that the lock is released upon power-on and reset of the CPU 302, and the system firmware is executed upon completion of the pre-boot to start the lock.

The input/output terminal is an external connection terminal to connect to an external device. For example, the input/output terminal may be a LAN terminal that conforms to a wired LAN interface on which the communication unit 350 performs communication control, a USB terminal that conforms to a USB communication interface, or the like. The input/output terminal may also be an HDMI (High-Definition Multimedia Interface) (registered trademark) terminal for connecting display data to be displayed on the display unit 110 to an external display device (an external display device, a projector, or the like). The input/output terminal is connected to the EC 200 or the system processing unit 300.

Next, a configuration related to the login authentication processing will be described in detail.

Figure 6:
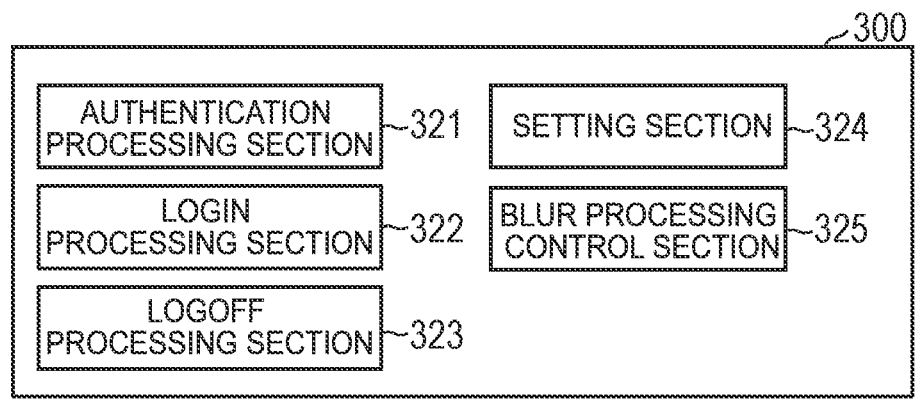
FIG. 6 is a schematic block diagram illustrating a configuration example of a system processing unit according to the first embodiment.

FIG. 6 is a block diagram illustrating an example of the functional configuration of the system processing unit 300 according to the embodiment. As an example of a configuration related to login authentication processing in the functional configuration executed by the CPU 302, the system processing unit 300 includes an authentication processing section 321, a login processing section 322, a logoff processing section 323, a setting section 324, and a blur processing control section 325.

The authentication processing section 321 executes face authentication processing based on a captured image output from the imaging unit 120. The face authentication processing includes face detection processing and face matching processing. The face detection processing is processing for defining a face area as an area of a face image from image data of the captured image output from the imaging unit 120. The face image is an image of the face of a person present in front of the information processing apparatus 1. Note that the depth information acquired by the imaging unit 120 may be used in the authentication processing section for face detection processing. The face matching processing has a step of determining the positions of plural face feature points (for example, mouth, eyes, nose, etc.) representing the features of the face from the face area, normalizing the position and size of the face area to be predetermined position and size, respectively, and defining a distribution of the normalized face feature points as image feature values, and a step of matching the defined image feature values with image feature values of the face image of a predetermined person to identify the person having image feature values with which matching is successful. In the storage unit 360, authentication information is set for each account as an authorized user who logs in to the account. The authentication information includes image feature values of the face image of the user. The authentication information is stored in further association with user information indicating the user. The user information may be information capable of identifying the user of the information processing apparatus 1, such as a user name, a user ID (Identifier), or the like.

As a result of matching the face image of the person captured by the imaging unit 120 with the authentication information on the set user, when it can be determined to match with each other, the authentication processing section 321 determines that the face authentication is successful. On the other hand, for example, when a person other than the person using the information processing apparatus 1 cuts across in front of the information processing apparatus 1 by chance, the authentication processing section 321 detects no face area from the image captured by the imaging unit 120. The authentication processing section 321 outputs, to the login processing section 322, the authentication result indicative of success/failure of the face authentication.

The login processing section 322 executes login processing to log in based on the authentication result by the authentication processing section. When the boot processing is started, the login processing section 322 instructs the authentication processing section 321 to execute the face authentication processing before allowing access to the OS, and pauses the subsequent boot processing. When the authentication result by the authentication processing section 321 is successful, the login processing section 322 allows the login, and resumes the execution of the paused boot processing to execute the login processing. On the other hand, when the authentication result by the authentication processing section 321 is unsuccessful, the login processing section 322 outputs a notification of not allowing the login and leaves the execution of the boot processing paused.

The logoff processing section 323 executes logoff processing to log off from the login state. For example, when receiving a logoff instruction (an instruction to make a transition to the standby state) with a user's operation, by the OS processing, by the HPD processing, or the like, the logoff processing section 323 executes the logoff processing.

In the login state, the setting section 324 configures the settings, such as various OS settings and various application settings, based on user's operations accepted by the input device 150. The setting section 324 stores configured setting information in the storage unit 360. For example, based on a user's operation to the operation button B11 on the settings screen illustrated in FIG. 1, the setting section 324 sets whether to perform blur processing to be executed by the image processing unit 123 of the imaging unit 120 (On/Off of blur processing (Blur)). When the blur processing is set to On, a captured image acquired from the imaging unit 120 in processing by an application running on the OS becomes a captured image after being subjected to blur processing. When the blur processing is set to Off, the captured image acquired from the imaging unit 120 in the processing by the application running on the OS becomes a captured image without being subjected to blur processing.

The blur processing control section 325 instructs the imaging unit 120 not to perform blur processing at least during a period in which the authentication processing section 321 executes the face authentication processing. For example, the blur processing control section 325 outputs a control signal to instruct the imaging unit 120 not to perform blur processing according to the timing when the authentication processing section 321 starts the face authentication processing. When acquiring this control signal, the image processing unit 123 of the imaging unit 120 outputs image data of the captured image without being subjected to blur processing.

Further, when the blur processing is set to On by the setting section 324, the blur processing control section 325 outputs a control signal to instruct the imaging unit 120 to perform blur processing according to the timing when the authentication result by the authentication processing section 321 is successful. When acquiring this control signal, the image processing unit 123 of the imaging unit 120 outputs image data of the captured image after being subjected to blur processing.

Thus, the blur processing control section 325 controls the imaging unit 120 not to perform blur processing during the period after the start of the face authentication processing by the authentication processing section 321 until the authentication result becomes successful. Note that the blur processing control section 325 may control the imaging unit 120 not to perform blur processing during a period from the start to end of the face authentication processing by the authentication processing section 321 (that is, only the period of the authentication processing).

Next, the operation of processing according to the embodiment will be described.

(Operation of HPD Processing)

Figure 7:
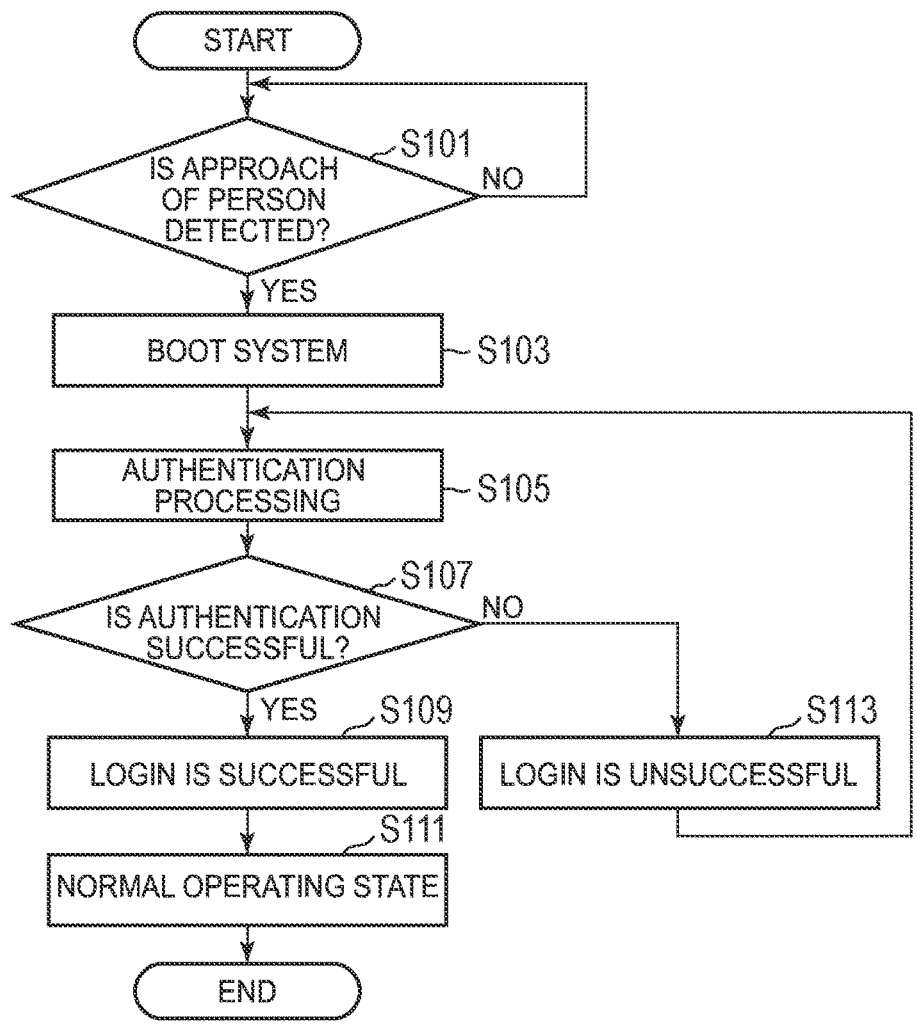
FIG. 7 is a flowchart illustrating an example of boot control according to the first embodiment.

First, the operation of boot processing to start the system processing when the information processing apparatus 1 detects the approach of a person. FIG. 7 is a flowchart illustrating an example of boot control according to the embodiment. Here, it is assumed that the information processing apparatus 1 is placed open on a desk or the like in the standby state.

(Step S101) Based on a detection signal acquired from the proximity sensor 130, the EC 200 determines whether the approach of a person to the information processing apparatus 1 is detected. When a person is detected after no person is detected within the person detection range, the EC 200 determines that the approach of a person to the information processing apparatus 1 is detected. When no person remains detected within the person detection range, the EC 200 determines that the approach of a person to the information processing apparatus 1 is not detected. Then, when determining that the approach of a person to the information processing apparatus 1 is not detected (NO), the EC 200 performs processing in step S101 again. On the other hand, when determining that the approach of a person to the information processing apparatus 1 is detected (YES), the EC 200 proceeds to processing in step S103.

(Step S103) The EC 200 starts the system processing by the system processing unit 300. Specifically, when starting the system processing by the system processing unit 300, the EC 200 outputs, to the power supply unit 400, the control signal to supply power necessary for the operation of each unit of the information processing apparatus 1. Further, the EC 200 outputs the start signal to instruct the system processing unit 300 to start the system processing. When acquiring the start signal, the system processing unit 300 starts boot processing. Then, the procedure proceeds to processing in step S105.

(Step S105) The system processing unit 300 executes login authentication processing. For example, the system processing unit 300 executes the login authentication processing by face authentication based on a captured image acquired from the imaging unit 120, and proceeds to processing in step S107.

(Step S107) The system processing unit 300 determines whether the authentication result is successful or not. When determining that the authentication result is successful (YES), the system processing unit 300 proceeds to processing in step S109. On the other hand, when determining that the authentication result is unsuccessful (NO), the system processing unit 300 proceeds to processing in step S113.

(Step S109) When the authentication result is successful, the system processing unit 300 outputs a notification that the login is successful (for example, displays the notification on the display unit 110) to continue the boot processing. Then, the procedure proceeds to processing in step S111.

(Step S111) The system processing unit 300 ends the boot processing and makes a transition to the normal operating state.

(Step S113) When the authentication result is unsuccessful, the system processing unit 300 outputs a notification that the login is unsuccessful (for example, displays the notification on the display unit 110), and returns to the authentication processing in step S105. When the authentication processing is unsuccessful continuously a predetermined number of times, the system processing unit 300 may stop the authentication processing and make a transition to a state of disabling the execution of the login authentication processing.

Next, the operation of processing for transition to the standby state to make a transition of the system processing from the normal operating state to the standby state as a result of detecting leaving of a person from the information processing apparatus 1 will be described.

Figure 8:
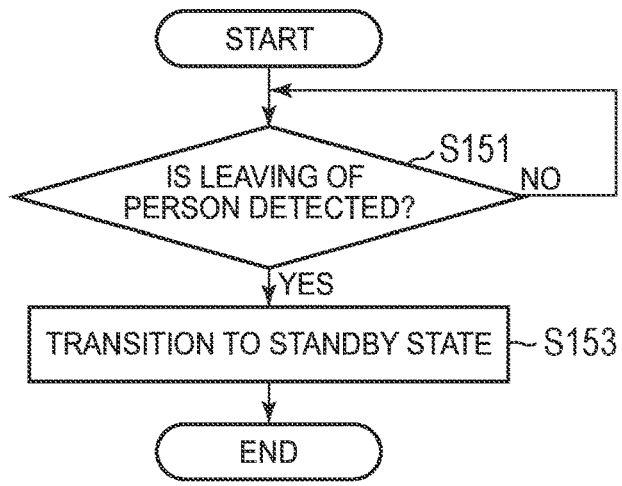
FIG. 8 is a flowchart illustrating an example of processing for transition to a standby state according to the first embodiment.

FIG. 8 is a flowchart illustrating an example of the processing for transition to the standby state according to the embodiment. Here, it is assumed that the information processing apparatus 1 is placed on the desk or the like in the closed state and the operating state thereof is the normal operating state. Further, a case where there is no waiting time upon transition to the standby state (corresponding to the transition waiting time=0 seconds) will be described.

(Step S151) Based on a detection signal acquired from the proximity sensor 130, the EC 200 determines whether leaving of a person from the information processing apparatus 1 is detected or not. For example, when no longer detecting a person after the person is detected within the person detection range, the EC 200 determines that leaving of the person from the information processing apparatus 1 is detected. On the other hand, when the person remains detected within the person detection range, the EC 200 determines that leaving of the person from the information processing apparatus 1 is not detected. Then, when leaving of the person from the information processing apparatus 1 is not detected (NO), the EC 200 performs processing in step S151 again. On the other hand, when leaving of the person from the information processing apparatus 1 is detected (YES), the EC 200 proceeds to processing in step S153.

(Step S153) The EC 200 makes a transition of the system processing by the system processing unit 300 from the normal operating state to the standby state. Specifically, the EC 200 outputs a standby signal to instruct the system processing unit 300 to make a transition of the system processing to the standby state. When acquiring the standby signal, the system processing unit 300 makes a transition from the normal operating state to the standby state. Further, EC 200 outputs, to the power supply unit 400, a control signal to stop the supply of power unnecessary in the standby state.

(Operation of Blur Control Processing)

Next, the operation of blur control processing of the information processing apparatus 1 to control the blur processing for a captured image acquired from the imaging unit 120 to be turned off during a period of the authentication processing upon login will be described.

Figure 9:
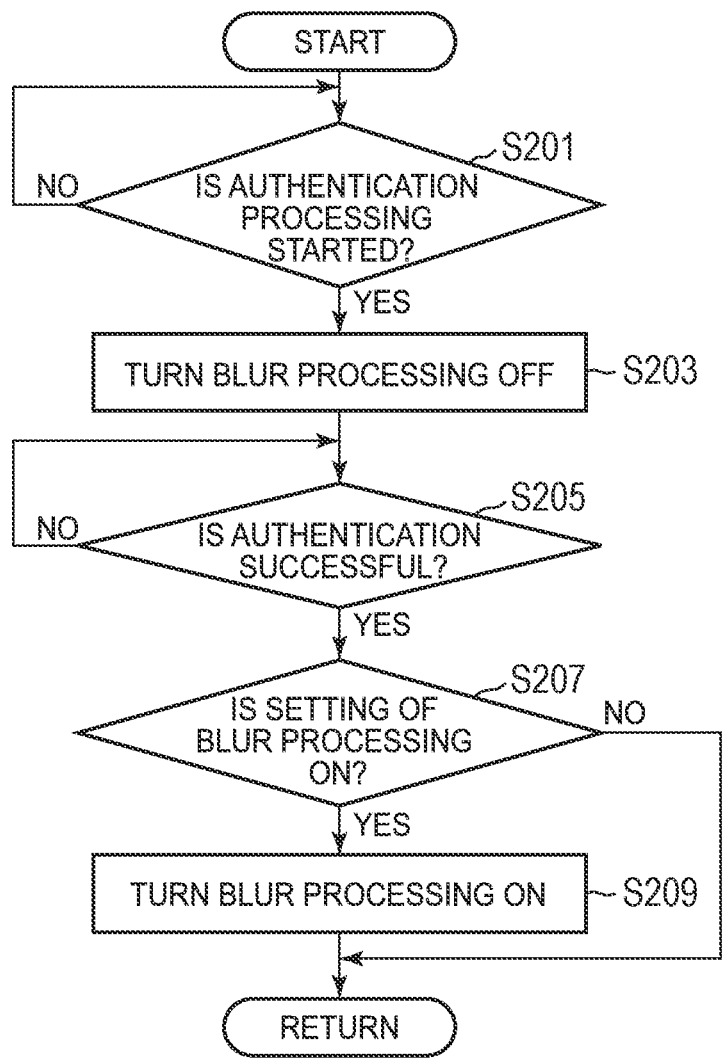
FIG. 9 is a flowchart illustrating an example of blur control processing according to the first embodiment.

FIG. 9 is a flowchart illustrating an example of blur control processing according to the embodiment.

(Step S201) The system processing unit 300 determines whether it is the start timing of the authentication processing for login authentication in the boot processing. When determining that it is the start timing of the authentication processing (YES), the system processing unit 300 proceeds to processing in step S203. On the other hand, when determining that it is not the start timing of the authentication processing (NO), the system processing unit 300 performs processing in step S201 again.

(Step S203) The system processing unit 300 instructs the imaging unit 120 not to perform blur processing. Then, the procedure proceeds to processing in step S205.

(Step S205) The system processing unit 300 determines whether the authentication result of the authentication processing is successful or not. When determining that the authentication result is successful (YES), the system processing unit 300 proceeds to processing in step S207. On the other hand, when determining that the authentication result is unsuccessful (NO), the system processing unit 300 performs processing in step S205 again.

(Step S207) The system processing unit 300 determines whether the blur processing set with a user's operation is On. When determining that the blur processing is set On (YES), the system processing unit 300 proceeds to processing in step S209. On the other hand, when determining that the blur processing is set Off (NO), since there is no problem that the blur processing remains Off, the system processing unit 300 returns to processing in step S201.

(Step S209) The system processing unit 300 instructs the imaging unit 120 not to perform blur processing. Then, the procedure returns to processing in step S201.

Note that, when determining that the blur processing is set Off (NO) in step S207, the system processing unit 300 may instruct the imaging unit 120 not to perform the blur processing. Further, the system processing unit 300 may determine in step S205 whether to log in or not so that the system processing unit 300 will proceed to the processing in step S207 when determining the login.

As described above, the information processing apparatus 1 according to the embodiment includes the imaging unit 120, the authentication processing section 321, the login processing section 322, and the blur processing control section 325. The imaging unit 120 acquires an RGB image of an imaging target and depth information generated as a result of detecting a distance to the imaging target using IR (infrared light), and outputs either a captured image obtained by performing blur processing on a background area determined to be the background in the RGB image based on the depth information, or a captured image obtained without performing the blur processing on the RGB image. The authentication processing section 321 executes the authentication processing based on the captured image output from the imaging unit 120. The login processing section 322 executes login processing to log in based on the authentication result by the authentication processing section 321. Then, the blur processing control section 325 instructs the imaging unit 120 not to perform the blur processing at least during a period in which the authentication processing section 321 executes the authentication processing.

Thus, even when the camera side performs blur processing on a background area of a captured image from the viewpoint of privacy protection, since the blur processing is not performed at least during the period of authentication processing, the information processing apparatus 1 can balance the privacy protection and the authentication processing upon login. Therefore, the information processing apparatus 1 can appropriately control the blur processing on the camera side.

Further, the information processing apparatus 1 includes the input device 150 for accepting user's operations (an example of the input unit), and the setting section 324 for setting whether to perform the above-mentioned blur processing in the login state based on a user's operation accepted by the input device 150.

Thus, the information processing apparatus 1 can set, at user's discretion, whether to blur the background of a captured image (video) in an application for a video conference or video delivery used during login.

When it is set to perform blur processing by the setting section 324 in response to the login by the login processing section 322, the blur processing control section 325 instructs the imaging unit 120 to perform the above-mentioned blur processing. Further, when it is set not to perform blur processing by the setting section 324, the blur processing control section 325 instructs the imaging unit 120 not to perform the above-mentioned blur processing. Thus, the information processing apparatus 1 can appropriately control the blur processing on the camera side.

When the blur processing is turned off at the time of authentication processing, the information processing apparatus 1 can control whether to turn on the blur processing after the login according to the user's intention.

Second Embodiment

Next, a second embodiment of the present invention will be described.

Since the basic configuration of the information processing apparatus 1 according to the embodiment is the same as that of the first embodiment, processing characteristic of the embodiment will be described. In the embodiment, part of blur control processing is different from that of the first embodiment.

The blur processing control section 325 instructs the imaging unit 120 not to perform blur processing according to the timing when the logoff processing section 323 executes logoff processing. Further, the blur processing control section 325 instructs the imaging unit 120 to perform blur processing in response to the login by the login processing section 322.

Figure 10:
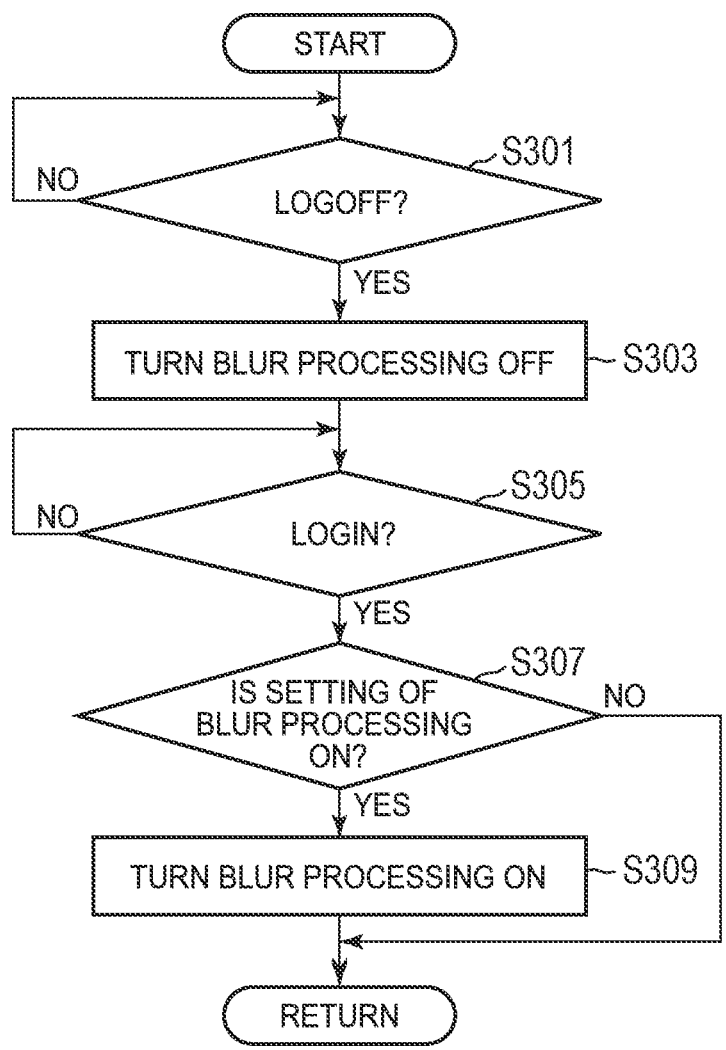
FIG. 10 is a flowchart illustrating an example of blur control processing according to a second embodiment.

FIG. 10 is a flowchart illustrating an example of blur control processing according to the embodiment.

(Step S301) The system processing unit 300 determines whether a logoff instruction is received in the login state. When determining that the logoff instruction is received (YES), the system processing unit 300 proceeds to processing in step S303. On the other hand, when determining that no logoff instruction is received (NO), the system processing unit 300 performs processing in step S301 again.

(Step S303) The system processing unit 300 instructs the imaging unit 120 not to perform blur processing. Then, the system processing unit 300 proceeds to processing in step S305.

(Step S305) The system processing unit 300 executes login authentication processing to determine whether login is done or not. When determining that login is done (YES), the system processing unit 300 proceeds to processing in step S307. On the other hand, when determining that login is not done (NO), the system processing unit 300 performs processing in step S305 again.

(Step S307) The system processing unit 300 determines whether the setting of blur processing set with a user's operation is On or not. When determining that blur processing is set to On (YES), the system processing unit 300 proceeds to processing in step S309. On the other hand, when determining that blur processing is set to Off (NO), the system processing unit 300 returns to processing in step S301 because there is no problem to leave blur processing Off.

(Step S309) The system processing unit 300 instructs the imaging unit 120 to perform blur processing. Then, the system processing unit 300 returns to processing in step S301.

In step S307, when determining that blur processing is set to Off (NO), the system processing unit 300 may also instruct the imaging unit 120 not to perform blur processing. Further, in step S305, the system processing unit 300 may also determine whether the authentication result of authentication processing is successful or not, and proceed to processing in step S307 when determining that the authentication result is successful.

Thus, the information processing apparatus 1 according to the embodiment instructs the imaging unit 120 not to perform blur processing according to the timing when the logoff processing section 323 executes logoff processing. Thus, even when the camera side performs blur processing on a background area of a captured image from the viewpoint of privacy protection, since the blur processing is not performed during the period of authentication processing upon login, the information processing apparatus 1 can balance the privacy protection and the authentication processing upon login. Therefore, the information processing apparatus 1 can appropriately control the blur processing on the camera side.

Further, the blur processing control section 325 instructs the imaging unit 120 to perform blur processing in response to the login by the login processing section 322. Thus, even when the blur processing is cancelled upon logoff, since the blur processing can be applied after login, the information processing apparatus 1 can balance the privacy protection and the authentication processing upon login.

Third Embodiment

Next, a third embodiment of the present invention will be described.

Since the basic configuration of the information processing apparatus 1 according to the embodiment is the same as that of the first embodiment, processing characteristic of the embodiment will be described. In the embodiment, part of blur control processing is different from those of the first and second embodiments.

The information processing apparatus 1 may control blur processing to Off in response to the fact that the approach of a person is detected. For example, the blur processing control section 325 may instruct the imaging unit 120 not to perform blur processing in response to the fact that the person detection unit 210 detects the approach of a person to the information processing apparatus 1.

Figure 11:
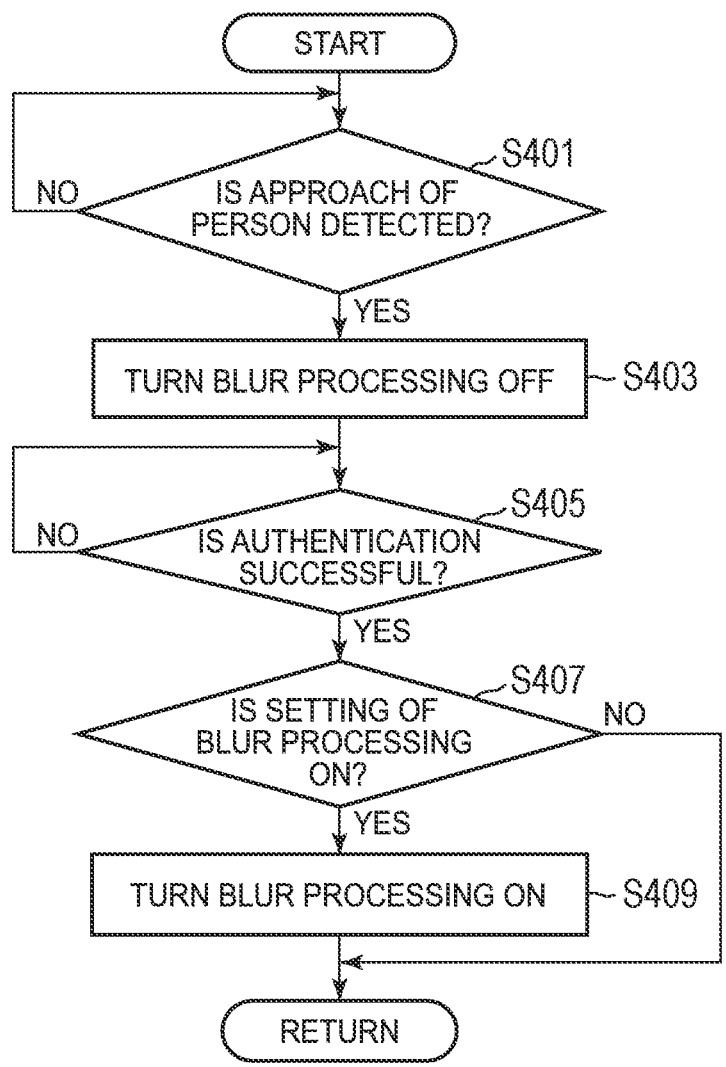
FIG. 11 is a flowchart illustrating an example of blur control processing according to a third embodiment.

FIG. 11 is a flowchart illustrating an example of blur control processing according to the embodiment.

(Step S401) The system processing unit 300 determines whether the person detection unit 210 detects the approach of a person to the information processing apparatus 1 or not. When determining that the approach of a person is detected (YES), the system processing unit 300 proceeds to processing in step S403. On the other hand, when determining that the approach of a person is not detected (NO), the system processing unit 300 performs processing in step S401 again.

(Step S403) The system processing unit 300 instructs the imaging unit 120 not to perform blur processing. Then, the system processing unit 300 proceeds to processing in step S405.

(Step S405) The system processing unit 300 determines whether the authentication result of authentication processing is successful or not. When determining that the authentication result is successful (YES), the system processing unit 300 proceeds to processing in step S407. On the other hand, when determining that the authentication result is unsuccessful (NO), the system processing unit 300 performs processing in step S405 again.

(Step S407) The system processing unit 300 determines whether the setting of blur processing set with a user's operation is On or not. When determining that blur processing is set to On (YES), the system processing unit 300 proceeds to processing in step S409. On the other hand, when determining that blur processing is set to Off (NO), the system processing unit 300 returns to processing in step S401 because there is no problem to leave blur processing Off.

(Step S409) The system processing unit 300 instructs the imaging unit 120 to perform blur processing. Then, the system processing unit 300 returns to processing in step S401.

In step S407, when determining that blur processing is set to Off (NO), the system processing unit 300 may also instruct the imaging unit 120 not to perform blur processing. Further, in step S405, the system processing unit 300 may also determine whether login is done or not, and proceed to processing in step S407 when determining that login is done.

Thus, the information processing apparatus 1 according to the embodiment instructs the imaging unit 120 not to perform blur processing in response to the fact that the approach of a person is detected. Thus, even when the camera side performs blur processing on a background area of a captured image from the viewpoint of privacy protection, since the blur processing is not performed in login authentication processing to be performed in response to the fact that the approach of a person is detected, the information processing apparatus 1 can balance the privacy protection and the authentication processing upon login. Therefore, the information processing apparatus 1 can appropriately control the blur processing on the camera side.

In step S401, the system processing unit 300 (the blur processing control section 325) may also instruct the imaging unit 120 not to perform blur processing in response to the fact that the person detection unit 210 detects leaving of the person from the information processing apparatus 1. Likewise, in this case, even when the camera side performs blur processing on a background area of a captured image from the viewpoint of privacy protection, the information processing apparatus 1 can control the blur processing not to be performed in the login authentication processing.

While the embodiments of this invention have been described in detail with reference to the accompanying drawings, specific configurations are not limited to those of the above-described embodiments, and design changes and the like are included without departing from the scope of this invention. The respective configurations described in the above-described respective embodiments can be combined arbitrarily.

In the aforementioned embodiments, the configuration example of the information processing apparatus 1 having the function of HPD processing has been described, but the information processing apparatus 1 may also be configured not to have the function of HPD processing in the first and second embodiments.

Further, in the aforementioned embodiments, the configuration example of incorporating the imaging unit 120 in the information processing apparatus 1 has been described, but the present invention is not limited thereto. For example, the imaging unit 120 needs not to be incorporated in the information processing apparatus 1, and the imaging unit 120 may also be connected to the information processing apparatus 1 wirelessly or by wire as an external accessory of the information processing apparatus 1.

Further, in the aforementioned embodiments, the EC 200 configured to operate independently of the system processing unit 300 may be any processing unit such as a sensor hub or a chipset, or the above-described processing may be executed by any processing unit other than the EC 200 instead of the EC 200. It is usually the case that the sum of power consumption of the processing unit such as this EC 200 and the proximity sensor 130 is significantly less than the power consumption of the system processing unit 300.

Further, in the standby state described above, a state where an image preset to make a processed content invisible (for example, an image for a lock screen) is displayed on the display unit 110 (a so-called screen lock state) may also be included. Further, the activation of the operation of the system processing is not limited to the start of the system processing, and it may be releasing of the display unit 110 from the screen lock state, the start of displaying a screen on the display unit 110 or increasing the brightness of a display screen being already displayed, the start of execution of a predetermined application program, or the like.

Note that the information processing apparatus 1 described above has a computer system therein. Then, a program for implementing the function of each component included in the information processing apparatus 1 described above may be recorded on a computer-readable recording medium so that the program recorded on this recording medium will be read into the computer system and executed to perform processing in each component included in the information processing apparatus 1 described above. Here, the fact that "the program recorded on the recording medium is read into the computer system and executed" includes installing the program on the computer system. Here, it is assumed that the "computer system" includes the OS and hardware such as a peripheral device and the like. Further, the "computer system" may also include two or more computers connected through a network including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. The recording medium with the program stored thereon may be a non-transitory recording medium such as the CD-ROM.

A recording medium internally or externally provided to be accessible from a delivery server for delivering the program is included as the recording medium. Note that the program may be divided into plural pieces, downloaded at different timings, respectively, and then united in each component included in the information processing apparatus 1, or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through the network. The above-mentioned program may also be to implement some of the functions described above. Further, the program may also be a so-called differential file (differential program) capable of implementing the above-described functions in combination with a program(s) already recorded in the computer system.

Further, some or all of the functions of the information processing apparatus 1 in the above-described embodiments may be realized as an integrated circuit such as LSI (Large Scale Integration). Each function may be a processor implemented individually, or part or whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

The invention claimed is:

1. An information processing apparatus comprising:
an imaging unit configured to acquire an RGB image of an imaging target and depth information generated as a result of detecting a distance to the imaging target using infrared light, and to output either a captured image in which a background area determined to be a background in the RGB image is subjected to blur processing based on the depth information, or a captured image in which the blur processing is not performed on the RGB image;
an authentication processing section configured to execute authentication processing based on a captured image output from the imaging unit;
a login processing section configured to execute login processing to log in based on an authentication result by the authentication processing section; and
a blur processing control section configured to instruct the imaging unit not to perform the blur processing at least during a period in which the authentication processing section executes the authentication processing.

2. The information processing apparatus according to claim 1, further comprising:
a logoff processing section configured to execute logoff processing to log off from the login state,
wherein the blur processing control section instructs the imaging unit not to perform the blur processing when the logoff processing section executes logoff processing.

3. The information processing apparatus according to claim 1, wherein the blur processing control section instructs the imaging unit to perform the blur processing in response to login by the login processing section.

4. The information processing apparatus according to claim 1, further comprising:
an input unit configured to accept user's operations; and
a setting section configured to set whether to perform the blur processing in the login state based on a user's operation accepted by the input unit.

5. The information processing apparatus according to claim 4, wherein, when the blur processing control section is set to perform the blur processing by the setting section in response to the login by the login processing section, the blur processing control section instructs the imaging unit to perform the blur processing, and when the blur processing control section is set not to perform the blur processing by the setting section, the blur processing control section instructs the imaging unit not to perform the blur processing.

6. An information processing apparatus, comprising:
an authentication processing section configured to execute authentication processing based on a captured image output from an imaging unit which outputs either a captured image, obtained by capturing an image of an imaging target, extracting a background area from the captured image, and performing blur processing on the extracted background area, or a captured image without being subjected to the blur processing;
a login processing section configured to execute login processing to log in based on an authentication result by the authentication processing section;
a logoff processing section configured to execute logoff processing to log off from the login state; and
a blur processing control section configured to instruct the imaging unit not to perform the blur processing in the logoff state.

7. A control method for an information processing apparatus, comprising:

an imaging step of causing an imaging unit to acquire an RGB image of an imaging target and depth information generated as a result of detecting a distance to the imaging target using infrared light, and to output either a captured image in which a background area determined to be a background in the RGB image is subjected to blur processing based on the depth information, or a captured image in which the blur processing is not performed on the RGB image;

an authentication processing step of causing an authentication processing section to execute authentication processing based on a captured image output from the imaging unit;

a login processing step of causing a login processing section to execute login processing to log in based on an authentication result by the authentication processing section; and a blur processing control step of causing a blur processing control section to instruct the imaging unit not to perform the blur processing at least during a period in which the authentication processing section executes the authentication processing.

8. A control method for an information processing apparatus, comprising:

an acquisition step of causing an acquisition unit to acquire a captured image output from an imaging unit which outputs either a captured image, obtained by capturing an image of an imaging target, extracting a background area from the captured image, and performing blur processing on the extracted background area, or a captured image without being subjected to the blur processing;

an authentication processing step of causing an authentication processing section to execute authentication processing based on the captured image acquired by the acquisition unit;

a login processing step of causing a login processing section to execute login processing to log in based on an authentication result by the authentication processing section;

a logoff processing step of causing a logoff processing section to execute logoff processing to log off from the login state; and a blur processing control step of causing a blur processing control section to instruct the imaging unit not to perform the blur processing in the logoff state.

\* \* \* \* \*